(12) United States Patent
Zheng et al.

(10) Patent No.: US 11,141,967 B2
(45) Date of Patent: Oct. 12, 2021

(54) BONDING DEVICE AND BONDING METHOD FOR ATTACHING CURVED COVER PLATE WITH IRREGULAR SHAPE TO FLEXIBLE SCREEN

(71) Applicant: Yungu (Gu' an) Technology Co., Ltd., Langfang (CN)

(72) Inventors: Yi Zheng, Langfang (CN); Xiuyu Zhang, Langfang (CN); Guizhou Qiao, Langfang (CN)

(73) Assignee: YUNGU (GU'AN) TECHNOLOGY CO., LTD., Langfang (CN)

( * ) Notice: Subject to any disclaimer, the term of this patent is extended or adjusted under 35 U.S.C. 154(b) by 260 days.

(21) Appl. No.: 16/446,654

(22) Filed: Jun. 20, 2019

(65) Prior Publication Data
US 2019/0299582 A1 Oct. 3, 2019

Related U.S. Application Data

(63) Continuation of application No. PCT/CN2018/111498, filed on Oct. 23, 2018.

(30) Foreign Application Priority Data

Apr. 20, 2018 (CN) .......................... 201810362496.5

(51) Int. Cl.
*B32B 37/10* (2006.01)
*B32B 17/06* (2006.01)
(Continued)

(52) U.S. Cl.
CPC ........ *B32B 37/1018* (2013.01); *B29C 66/112* (2013.01); *B32B 17/06* (2013.01);
(Continued)

(58) Field of Classification Search
CPC .............. B32B 17/06; B32B 2457/206; B32B 37/1018; B29C 66/112; B29C 63/20; B29C 66/81
See application file for complete search history.

(56) References Cited

U.S. PATENT DOCUMENTS

2014/0345792 A1* 11/2014 Lee ..................... B32B 37/0046
156/228
2017/0263492 A1 9/2017 Son et al.
(Continued)

FOREIGN PATENT DOCUMENTS

| CN | 104471630 A | 3/2015 |
| CN | 107016936 A | 8/2017 |

(Continued)

OTHER PUBLICATIONS

EnglishTranslation of CN104471630.*
(Continued)

*Primary Examiner* — Sonya M Sengupta
(74) *Attorney, Agent, or Firm* — Kilpatrick Townsend & Stockton

(57) ABSTRACT

A bonding device and a bonding method for attaching a curved cover plate with an irregular shape to a flexible screen are disclosed. The bonding device includes a first bonding body, a second bonding body, and a pressing body for pressing a center portion of the flat area of the curved cover plate with the irregular shape, and a driving mechanism for driving the first bonding body and the second bonding body to move. The first bonding body includes a first pressing wall on a periphery thereof, the first pressing wall includes a first pressing flat wall and a first pressing curved wall. The second bonding body includes a second pressing wall on a periphery thereof. The second pressing wall includes a second pressing flat wall and a second (Continued)

pressing curved wall. The pressing body has a third pressing flat wall formed on a periphery thereof.

15 Claims, 6 Drawing Sheets

(51) Int. Cl.
    *B29C 65/00*     (2006.01)
    *B29C 63/20*     (2006.01)
(52) U.S. Cl.
    CPC .............. *B29C 63/20* (2013.01); *B29C 66/81* (2013.01); *B32B 2457/206* (2013.01)

(56) References Cited

U.S. PATENT DOCUMENTS

| | | | | |
|---|---|---|---|---|
| 2019/0077262 A1* | 3/2019 | Benjamin | ............... | B60K 35/00 |
| 2019/0315109 A1* | 10/2019 | Zhang | ................ | B32B 37/0053 |
| 2019/0329540 A1* | 10/2019 | Kim | ....................... | B32B 27/281 |
| 2020/0101712 A1* | 4/2020 | Qiao | ................... | H01L 51/0097 |

FOREIGN PATENT DOCUMENTS

| | | |
|---|---|---|
| CN | 108615467 A | 10/2018 |
| KR | 20160043685 A | 4/2016 |
| WO | 2014021192 A1 | 2/2014 |

OTHER PUBLICATIONS

EnglishTranslation of CN107016936.*
EnglishTranslation of CN108615467.*
EnglishTranslation of KR20160043685.*
First Office Action with search report dated Mar. 11, 2019 in the corresponding CN application (application No. 201810362496.5).
CN Second Office Action with search report dated May 14, 2019 in the corresponding CN application (application No. 201810362496.5).

* cited by examiner

BONDING DEVICE AND BONDING METHOD FOR ATTACHING CURVED COVER PLATE WITH IRREGULAR SHAPE TO FLEXIBLE SCREEN

CROSS-REFERENCES TO RELATED APPLICATIONS

The present application is a continuation application of International Application No. PCT/CN2018/111498, filed Oct. 23, 2018, and claims the priority to Chinese application No. 201810362496.5 filed Apr. 20, 2018, and both of which are incorporated herein by reference in their entireties.

BACKGROUND

The flexible screen is a new growth point of the future industry, and the characteristic of flexibility of the flexible screen are continuously exploited and utilized. For example, by attaching the flexible screen to a 3D fixed curved cover plate (both sides of the cover plate are a quarter of arc), the display of the front and sides of the product can be realized.

SUMMARY

Accordingly, it is necessary to provide a new bonding device for attaching a curved cover plate with an irregular shape to a flexible screen.

A bonding device for attaching a curved cover plate with an irregular shape to a flexible screen, in which the curved cover plate with the irregular shape includes a flat area and arc hook areas located on both opposite sides of the flat area, and the arc hook areas smoothly transit with the flat area. The bonding device for attaching the curved cover plate with the irregular shape to the flexible screen includes: a first bonding body, a second body, a pressing body, and a driving mechanism.

The first bonding body has a first pressing wall on its periphery. The first pressing wall includes a first pressing curved wall matching shapes of inner surfaces of the arc hook areas of the curved cover plate with the irregular shape and a first pressing flat wall provided continuously with the first pressing curved wall to correspond to a portion of the flat area of the curved cover plate with the irregular shape.

The second bonding body has a second pressing wall on its periphery. The second pressing wall includes a second pressing curved wall matching shapes of inner surfaces of the arc hook areas of the curved cover plate with the irregular shape and a second pressing flat wall provided continuously with the second pressing curved wall to correspond to a portion of the flat area of the curved cover plate with the irregular shape.

The pressing body is used to press a center portion of the flat area of the curved cover plate with the irregular shape, the pressing body is located between the first bonding body and the second bonding body, and the pressing body has a third pressing flat wall used to press the center portion of the flat area of the curved cover plate with the irregular shape on a periphery of the pressing body.

The driving mechanism is used to drive the first bonding body and the second bonding body to move adjacent to or apart from the pressing body.

In one of the embodiments, the first bonding body and the second bonding body are symmetrically arranged.

In one of the embodiments, the pressing body defines a cavity to receive the driving mechanism, and the driving mechanism is located in the cavity.

In one of the embodiments, the driving mechanism includes a first driving component to drive the first bonding body to move and a second driving component to drive the second bonding body to move.

The first driving component includes a first link rod and a first driving rod, the first driving rod is perpendicular to the third pressing flat wall, the first driving rod is reciprocally provided in the cavity of the pressing body with respect to the first bonding body, and the first driving rod is vertically connected to the first link rod.

The second driving component includes a second link rod and a second driving rod, the second driving rod is perpendicular to the third pressing flat wall, the second driving rod is reciprocally provided in the cavity of the pressing body with respect to the second bonding body, and the second driving rod is vertically connected to the second link rod.

In one of the embodiments, the first driving component and the second driving component are symmetrically arranged.

In one of the embodiments, the first pressing wall, the second pressing wall, and the third pressing flat wall are respectively provided with one or more vacuum adsorption holes.

In one of the embodiments, the first bonding body, the second bonding body, and the pressing body each have a vacuum cavity therein used to absorb the flexible screen.

The bonding device for the curved cover plate with the irregular shape and the flexible screen further includes: a first telescopic connector used to connect the pressing body and the vacuum cavity of inner of the first bonding body, both ends of the first telescopic connector are fixed to the pressing body and the first bonding body, respectively, and is capable of being compressed until the pressing body is adjacent to the first bonding body; and a second telescopic connector used to connect the pressing body and the vacuum cavity of inner of the second bonding body, both ends of the second telescopic connector are fixed to the pressing body and the second bonding body, respectively, and is compressed until the pressing body is adjacent to the second bonding body.

In one of the embodiments, the first telescopic connector and the second telescopic connector are both rubber bellows.

In one of the embodiments, the bonding device for the curved cover plate with the irregular shape and the flexible screen further includes a cylinder used to control the driving mechanism to move along a direction towards or away from the arc hook area.

In one of the embodiments, the driving mechanism includes an expansion body and a gas source used to inflate the expansion body. The expansion bodies are located between the first bonding body and the pressing body, and the second bonding body and the pressing body, respectively. The expansion bodies are is used to push the first bonding body and the second bonding body to move along a direction away from the pressing body, so as to attach the first bonding body and the second bonding body to the flexible screen.

In one of the embodiments, the first bonding body, the second bonding body, the pressing body, and the driving mechanism are made of aluminum alloy.

In one of the embodiments, the first bonding body, the second bonding body, the pressing body, and the driving mechanism are coated with a flexible buffer layer.

A bonding method for attaching a curved cover plate with an irregular shape to a flexible screen is also provided, the method includes:

A flexible screen, a curved cover plate with an irregular shape, and the aforementioned bonding device for attaching the curved cover plate with the irregular shape to the flexible screen are provided. The curved cover plate with the irregular shape includes a flat area and arc hook areas located on both sides of the flat area, and the arc hook areas smoothly transit with the flat area.

The flexible screen is attached onto outer sides of the first bonding body, the pressing body, and the second bonding body, thus an initial body is obtained.

The initial body is inserted into an inner side of the curved cover plate with the irregular shape and the initial body is pressed, such that attaching a portion of the flat area of the curved cover plate with the irregular shape to the flexible screen is completed.

The driving mechanism is driven to drive the first bonding body and the second bonding body to move along a direction towards the hook arc areas, respectively, until attaching of the curved cover plate with the irregular shape to the flexible screen is completed.

In one of the embodiments, the first pressing wall, the second pressing wall, and the third pressing flat wall are provided with one or more vacuum adsorption holes. The step of attaching the flexible screen onto the outer sides of the first bonding body, the pressing body, and the second bonding body includes: attaching the flexible screen onto the outer sides of the first bonding body, the pressing body, and the second bonding body by vacuum adsorption.

In one of the embodiments, prior to driving the driving mechanism, the method further includes reducing an adsorption pressure of the vacuum adsorption.

In one of the embodiments, the adsorption pressure is reduced from a pressure range of −60 kpa to −80 kpa to a pressure range of −5 kpa to −20 kpa.

Applying the bonding device for the curved cover plate with the irregular shape and the flexible screen of the technical solution according to the present disclosure, the first pressing flat wall of the first bonding body, the second pressing flat wall of the second bonding body, and the third pressing flat wall of the pressing body are cooperatively used to press the flat area of the curved cover plate with the irregular shape. The first pressing curved wall of the first bonding body and the second pressing curved wall of the second bonding body are both used to press the arc hook areas of the curved cover plate with the irregular shape. The driving mechanism drives the first bonding body and the second bonding body to move, such that the first and the second bonding body are adjacent to or away from the pressing body, thereby sufficiently attaching the curved cover plate with the irregular shape and the flexible screen, and further improving the bonding effect.

Applying the bonding method for the curved cover plate with the irregular shape and the flexible screen of the technical solution according to the present disclosure, the initial body is inserted into the inner side of the curved cover plate with the irregular shape, thereby avoiding interference between both ends of the flexible screen and the both ends of the curved cover plate with the irregular shape. Additionally, the hook arc areas of the curved cover plate with the irregular shape is sufficiently attached by the aforementioned method, thereby further improving the bonding effect.

DETAILED DESCRIPTION OF THE INVENTION

The above objects, features and advantages of the present disclosure will become more apparent by describing in detail embodiments thereof with reference to the accompanying drawings. The following description provides specific details for a thorough understanding of the present disclosure. However, the present disclosure can be implemented in many other ways than those described herein, and those skilled in the art can make similar modifications without departing from the scope of the present disclosure, and thus the present disclosure is not limited by the specific embodiments disclosed below.

At present, a conventional bonding method of the flexible screen is pressing the flexible onto the inner side of a glass cover plate via a silicon pad.

However, a conventional bonding device can only bond the 3D fixed curved cover plate, when the cover plate is designed to be bent inward, that is, when the cover plate has an irregular shape, the bonding cannot be realized by the conventional bonding device.

Accordingly, a bonding device for attaching a curved cover plate with an irregular shape to a flexible screen is provided.

Figure 1:
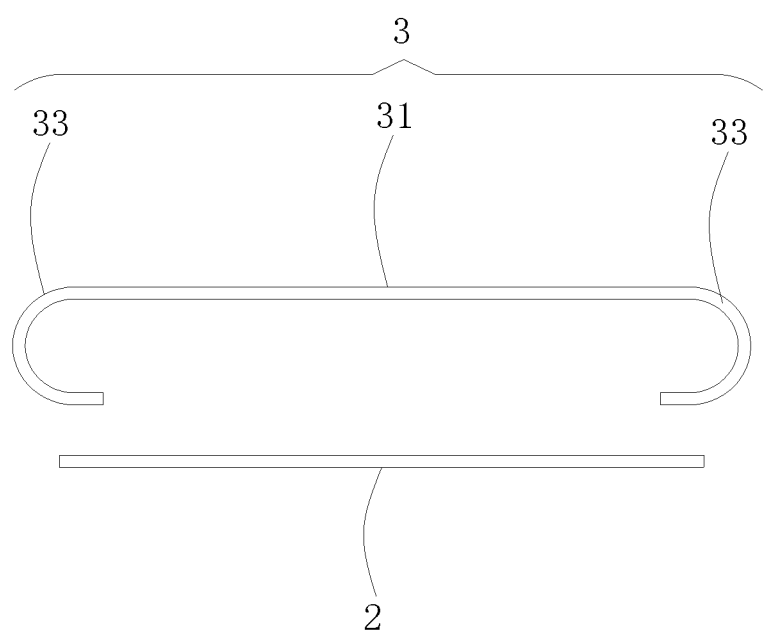
FIG. 1 is a schematic view of a flexible screen and a curved cover plate with an irregular shape.
Figure 2:
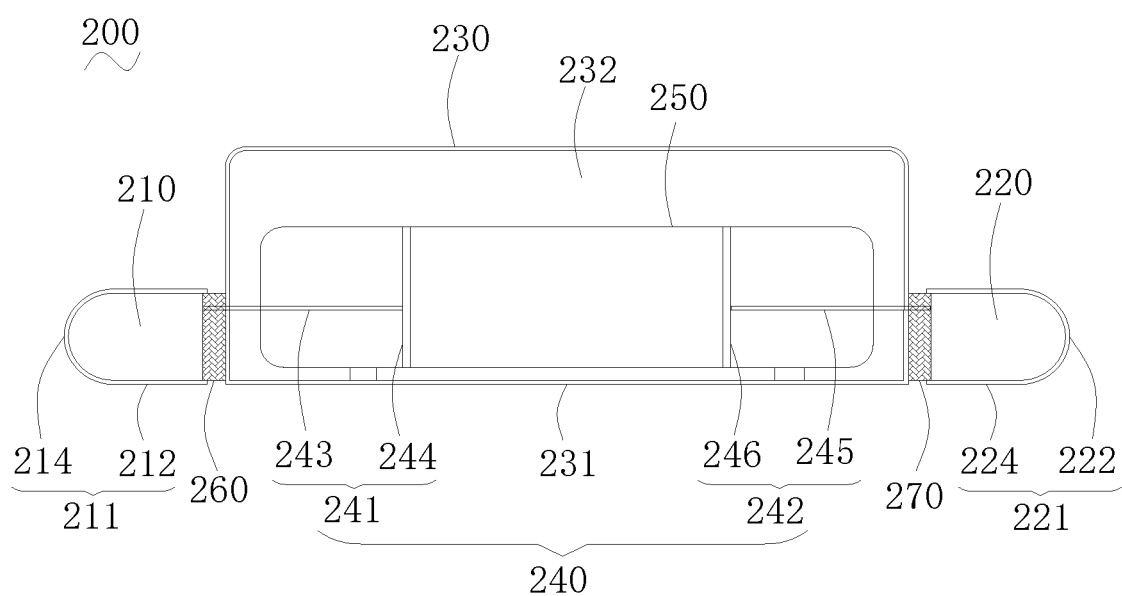
FIG. 2 is a schematic view of a bonding device for attaching a curved cover plate with an irregular shape to a flexible screen according to an embodiment of the present disclosure.

As shown in FIG. 1 to FIG. 2, a bonding device 200 according to an embodiment of the present disclosure for attaching a curved cover plate with an irregular shape to a flexible screen is used to bond the flexible screen 2 to an inner surface of the cover plate 3 with the irregular shape. The cover plate 3 with the irregular shape includes a flat area 31 with a planar shape, and arc hook areas 33 located on both sides of the flat area 31, and the arc hook areas 33 smoothly transit with the flat area 31. In other words, the flat area 31 is located in a center position, and two arc hook areas 33 formed by bending inwards are located on the two opposite sides, respectively. Preferably, in the illustrated embodiment, the arc hook areas 33 have semi-circular shapes that are tangential to the flat area 31.

The bonding device 200 for attaching the curved cover plate with the irregular shape to the flexible screen includes a first bonding body 210 used to press a side of the flexible screen 2, a second bonding body 220 used to press another side of the flexible screen 2, and a pressing body 240 used to press a center portion of the flat area 31 of the curved cover plate 3 with the irregular shape, and a driving mechanism 240.

The first bonding body 210 has a first pressing wall on a periphery thereof. The first pressing wall 211 includes a first pressing curved wall 214 matching shapes of inner surfaces of the arc hook areas 33 of the curved cover plate 3 with the irregular shape, and a first pressing flat wall 212 provided continuously with the first pressing curved wall 214 to correspond to a portion of the flat area 31 of the curved cover plate 3 with the irregular shape. Preferably, the first pressing flat wall 212 smoothly transits with the first pressing curved wall 214.

Specifically, the first pressing flat wall 212 has a planar shape, and the first pressing curved wall 214 has a semicircular shape matching the arc hook areas 33. That is, after the first pressing curved wall 214 is attached to the flexible screen 2, it can be pressed against the arc hook area 33. In other words, the radius difference between the first pressing curved wall 214 and the radius of the inner wall of the arc hook area 33 is the thickness of the flexible screen 2.

The second bonding body 220 has a second pressing wall on a periphery thereof. The second pressing wall 221 includes a second pressing curved wall 224 matching the shapes of inner surfaces of the arc hook areas 33 of the curved cover plate 3 with the irregular shape, and a second pressing flat wall 222 provided continuously with the second pressing curved wall 224 to correspond to the portion of the flat area 31 of the curved cover plate 3 with the irregular shape. Preferably, the second pressing flat wall 222 smoothly transits with the second pressing curved wall 224.

Specifically, the second pressing flat wall 222 has a planar shape, and the second pressing curved wall 224 has a semi-circular shape matching the inner surface of the arc acre 33, that is, the structure of the second pressing curved wall 224 is the same as the structure of the first pressing curved wall 214, and the second pressing curved wall 224 and the first pressing curved wall 214 are arranged opposite to each other. Of course, when the arc hook areas 33 on two sides of the flat area 31 have different structures, the structures of the second pressing curved wall 224 and the first pressing curved wall 214 may be adjusted accordingly.

The pressing body 230 is located between the first bonding body 210 and the second bonding body 220. The pressing body 230 has a third pressing flat wall 231 on a periphery thereof used to press the center portion of the flat area 31 of the curved cover plate 3 with the irregular shape. Specifically, the third pressing flat wall 231 has a planar shape.

The driving mechanism 240 is used to drive the first bonding body 210 and the second bonding body 220 to move adjacent to or apart from the pressing body 230.

Specifically, when the first bonding body 210 and the second bonding body 220 are adjacent to the pressing body 230, the first pressing flat wall 212, the third pressing flat wall 231, and the second pressing flat wall 222 are sequentially adjacent to each other, and the three are coplanar, that is, the first pressing flat wall 212, the third pressing flat wall 231, and the second pressing flat wall 222 are located in a same plane.

In addition to the aforementioned embodiment, the first bonding body 210 and the second bonding body 220 are symmetrically arranged. In this way, the symmetrical portions of the flexible screen 2 can be pressed simultaneously, thereby improving the pressing effect.

In addition to the aforementioned embodiment, the pressing body 230 has a cavity 232 therein used to receive the driving mechanism 240, and the driving mechanism 240 is located in the cavity.

More preferably, the driving mechanism 240 includes a first driving component 241 used to drive the first bonding body 210 to move and a second driving component 242 to drive the second bonding body 220 to move, and the first driving component 241 and the second driving component 242 are provided opposite to each other.

The first driving component 241 includes a first link rod 243 and a first driving rod 244. The first driving rod 244 is perpendicular to the third pressing flat wall 231, the first driving rod 244 is reciprocally provided in the cavity of the pressing body 230 with respect to the first bonding body 210, and the first driving rod 244 is vertically connected to the first link rod 243.

In the illustrated embodiment, the first link rod 243 is perpendicularly fixed to the middle position of the first driving rod 244. Of course, the first link rod 243 may be perpendicularly fixed to other position of the first driving rod 244, for example, be fixed to the upper end or the bottom end of the first driving rod 244. In the illustrated embodiment, the first link rod 243 is welded to the first driving rod 244. Of course, the first link rod 243 and the first driving rod 244 can be integrally formed, or the relative fixing between the first link rod 243 and the first driving rod 244 can be realized by other means.

The second driving component 242 includes a second link rod 245 and a second driving rod 246. The second driving rod 246 is perpendicular to the third pressing flat wall 231, the second driving rod 246 is reciprocally provided in the cavity of the pressing body 230 with respect to the second bonding body 220, and the second driving rod 242 is vertically connected to the second link rod 245.

In the illustrated embodiment, the second link rod 245 is perpendicularly fixed to the middle position of the second driving rod 246. Of course, the second link rod 245 may be perpendicularly fixed to other position of the second driving rod 246, for example, be fixed to the upper end or the bottom end of the second driving rod 246. In the illustrated embodiment, the second link rod 245 is welded to the second driving rod 246. Of course, the second link rod 245 and the second driving rod 246 can be integrally formed, or the relative fixing between the second link rod 245 and the second driving rod 246 can be realized by other means.

The first driving component 241 and the second driving component 242 move along right and left directions, so as to drive the first bonding body 210 and the second bonding body 220 to move along the right and left directions, respectively. Specifically, when the first driving component 241 and the second driving component 242 move along the directions away from the pressing body 230, the first bonding body 210 and the second bonding body 220 move to both sides, respectively. When the first driving component 241 and the second driving component 242 move along the directions towards the pressing body 230, the first bonding body 210 and the second bonding body 220 both move towards the middle, so as to approach the pressing body 230.

Preferably, the first driving component 241 and the second driving component 242 are symmetrically arranged. This facilitates applying the same pressures on the portions of the flexible screen 2 at the symmetrical positions, so as to improve the bonding effect.

It should be noted that, the driving mechanism 240 is not limited hereto, it can control the movements of the first bonding body 210 and the second bonding body 220 by other means, respectively.

In addition to the aforementioned embodiment, the bonding device 200 for attaching the curved cover plate with the irregular shape to the flexible screen further includes a cylinder 250 used to control the driving mechanism 240 to move along the direction towards or away from the arc hook areas 33. The cylinder 250 can effectively control the speed and time of the left and right movements of the driving mechanism 240, thereby saving manpower.

In addition to the aforementioned embodiment, the first pressing wall 211, the second pressing wall 221, and the third pressing flat wall 231 are provided with one or more vacuum adsorption holes (not shown). Therefore, the flexible screen 2 can be absorbed onto the first bonding body 210 and the second bonding body 220 by vacuum adsorption. Of course, the flexible screen 2 can be attached onto the first bonding body 210 and the second bonding body 220 by other means. For example, both ends of the flexible screen 2 are adhered with an elastic tape, and other ends of the elastic tapes are fixed to the first bonding body 210 and the second bonding body 220 on corresponding sides.

In addition to the aforementioned embodiment, the first bonding body 210 and the second bonding body 220 each have a vacuum cavity therein used to absorb the flexible screen 2.

The bonding device 200 for attaching the curved cover plate with the irregular shape to the flexible screen further includes a first telescopic connector 260 used to connect the pressing body 230 and the vacuum cavity of inner of the first bonding body 260 and a second telescopic connector 270 used to connect the pressing body 230 and the vacuum cavity of inner of the second bonding body 220.

Both ends of the first telescopic connector 260 are fixed to the pressing body 230 and the first bonding body 210, respectively, and the first telescopic connector 260 can be compressed until the pressing body 230 is adjacent to the first bonding body 210. Specifically, the fixing of both ends of the first telescopic connector 260 can be realized by adhering or riveting. Of course, other fixing means may also be applied.

Furthermore, the pressing body 230 being adjacent to the first bonding body 210 means that the pressing body 230 is very close to the first bonding body 210, including but not limited to that these two are connected and coplanar to each other, and there may still be a certain gap formed therebetween.

Both ends of the second telescopic connector 270 are fixed to the pressing body 230 and the second bonding body 220, respectively, and the second telescopic connector 270 can be compressed until the pressing body 230 is adjacent to the second bonding body 220. Specifically, the fixing of both ends of the second telescopic connector 270 can be realized by adhering or riveting. Of course, other fixing means may also be applied.

Furthermore, the pressing body 230 being adjacent to the second bonding body 220 means that the pressing body 230 is very close to the second bonding body 220, including but not limited to that these two are connected and coplanar to each other, and there may still be a certain gap formed therebetween.

In the illustrated embodiment, after the first telescopic connector 260 and the second telescopic connector 270 are compressed, there are still a certain gap between the first bonding body 210 and the second bonding body 220. In order to reduce the size of the aforementioned gap, both end surfaces of the pressing body 230 can be provided with a groove used to receive the first telescopic connector 260 and the second telescopic connector 270, respectively. Alternatively, both end surfaces of the first bonding body 210 and the second bonding body 220 opposite to the pressing body 230 can be provided with a groove used to receive the first telescopic connector 260 and the second telescopic connector 270, respectively. In this way, after the first telescopic connector 260 and the second telescopic connector 270 are compressed, they can be received in the aforementioned grooves, therefore the pressing body 230 can be jointly coplanar with the first bonding body 210 and the second bonding body 220, respectively, thereby sufficiently pressing the pressing body 230, the first bonding body 210, and the second bonding body 220 to the flexible screen 2.

Additionally, in the illustrated embodiment, since the vacuum cavity of the pressing body 230 is in communication with the vacuum cavity of the first bonding body 210 or the vacuum cavity of the second bonding body 220 by the first telescopic connector 260 or the second telescopic connector 270, only one vacuum adsorption device is required to be provided to simultaneously control the degrees of vacuum in the first bonding body 210, the second bonding body 220, and the pressing body 230.

The degrees of vacuum in the first bonding body 210, the second bonding body 220, and the pressing body 230 can also be separately controlled. In this case, a plurality of vacuum adsorption devices can be provided to separately control the first bonding body 210, the second bonding body 220, and the pressing body 230.

In addition to the aforementioned embodiment, the first telescopic connector 260 and the second telescopic connector 270 are both rubber bellows. It may be other telescopic elements that can perform a telescopic function and can communicate the pressing body 230 with the first bonding body 210 or the second bonding body 220.

Additionally, it should be noted that, the driving mechanism according to the present disclosure is not limited hereto, it can also be other mechanism that can drive the first bonding body 210 and the second bonding body 220 to move adjacent to or apart from the pressing body 230.

In another embodiment, the driving mechanism 240 includes two expansion bodies (not shown) and a gas source used to inflate the expansion bodies. The gas source is located at one side of the expansion bodies. The both expansion bodies are located between the first bonding body 210 and the pressing body 230, and the second bonding body 220 and the pressing body 230, respectively. And the both expansion bodies are connected to the first bonding body 210 and the pressing body 230, and the second bonding body 220 and the pressing body 230, respectively. The aforementioned expansion bodies are sealed inside, and independent from the first bonding body 210, the second bonding body 220, and the pressing body 230, respectively.

When inflating the expansion bodies, the volumes of the expansion bodies are increased, and the first bonding body 210 and the second bonding body 220 are pushed to move along the direction away from the pressing body 230, so as to attach the first bonding body 210 and the second bonding body 220 to the flexible screen 2.

Preferably, the expansion bodies are rubber air bags. The rubber air bag has a good elasticity, and it can apply a large pressure to the first bonding body 210 and the second bonding body 220 after expansion, such that the first bonding body 210 and the second bonding body 220 are pushed to move. In actual operation, the expansion bodies are the aforementioned first telescopic connector 260 and the second telescopic connector 270. In this case, the first telescopic connector 260 and the second telescopic connector 270 perform the function of driving and the function of gas-phase communicating the pressing body 230, the first bonding body 210, and the second bonding body 220.

In another embodiment, the driving mechanism 240 includes an elastic telescopic member (not shown) and a power source used to drive the elastic telescopic member. In this embodiment, the elastic telescopic member is independent from the first bonding body 210, the second bonding body 220, and the pressing body 230, respectively.

Preferably, the elastic telescopic member is a spring. When the spring is compressed, the first bonding body 210 and the second bonding body 220 are adjacent to the pressing body 230, respectively. When the force compressing the spring is released, the compressed spring can push the first bonding body 210 and the second bonding body 220 along the direction away from the pressing body 230, so as to attach the first bonding body 210 and the second bonding body 220 to the flexible screen 2. Additionally, the force compressing the spring may be slowly released, so as to slowly attach the first bonding body 210 and the second bonding body 220 to the flexible screen 2.

Additionally, the material of the first bonding body 210, the second bonding body 220, and the pressing body 230 is preferably the aluminum alloy, so as to ensure the sufficient strength to attach the first bonding body 210 and the second bonding body 220 to the flexible screen 2. Preferably, the first bonding body 210, the second bonding body 220, the pressing body 230, and the driving mechanism 240 are coated with a flexible buffer layer, so as to better protect the surface of the flexible screen 2.

In the aforementioned bonding device 200 for attaching the curved cover plate 3 with the irregular shape to the flexible screen 2, the first pressing flat wall 212 of the first bonding body 210, the second pressing flat wall 222 of the second bonding body 220, and the third pressing flat wall 231 of the pressing body 230 are cooperatively used to attach the flat area 31 of the curved cover plate 3 with the irregular shape. The first pressing curved wall 214 of the first bonding body 210 and the second pressing curved wall 224 of the second bonding body 220 are both used to press the arc hook areas 33 of the curved cover plate 3 with the irregular shape. The driving mechanism 240 drives the first bonding body 210 and the second bonding body 220 to move, such that the first bonding body 210 and the second bonding body 220 are adjacent to or apart from the pressing body 230, thereby sufficiently attaching the curved cover plate 3 with the irregular shape to the flexible screen 2, and further improving the bonding effect.

Figure 3:
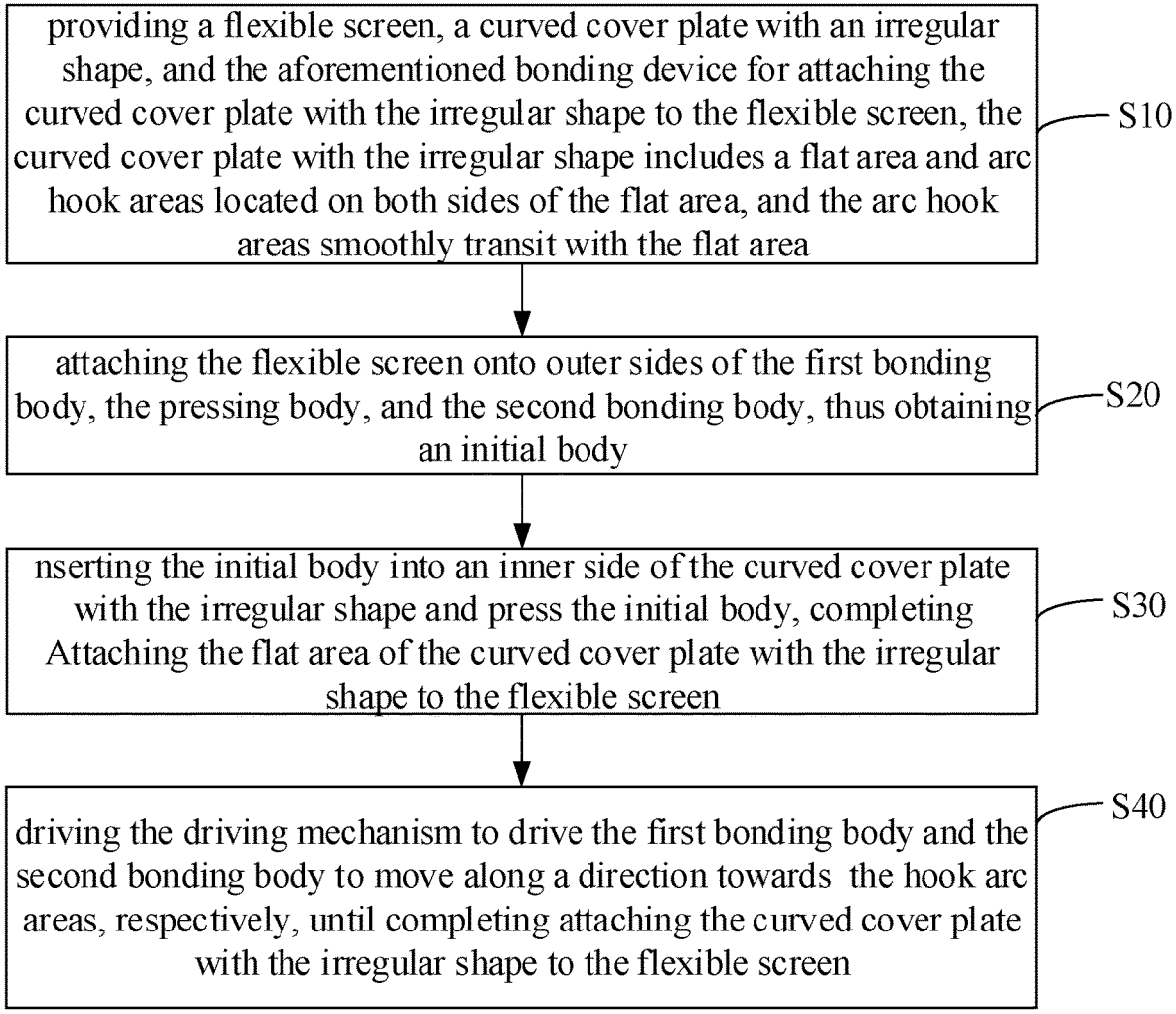
FIG. 3 is a flowchart of a bonding method for attaching a curved cover plate with an irregular shape to a flexible screen according to an embodiment of the present disclosure.

Referring to FIG. 3, a bonding method for attaching a curved cover plate with an irregular shape to a flexible screen according to an embodiment is shown. The method includes following steps:

Step S10, referring to FIG. 1 and FIG. 2, a flexible screen 2, a curved cover plate 3 with an irregular shape, and the aforementioned bonding device 200 for attaching the curved cover plate with the irregular shape to the flexible screen are provided. The curved cover plate 3 with the irregular shape includes a flat area 31 and arc hook areas 33 located on both sides of the flat area 31, and the arc hook areas 33 smoothly transit with the flat area 31.

The flexible screen 2 is preferably a flexible OLED screen. Of course, it should be noted that, the flexible screen 2 can be other flexible screens.

A bonding adhesive layer used to bond the flexible screen 2 and the curved cover plate 3 with the irregular shape can be further provided. The bonding adhesive layer is used to bond the flexible screen 2 and the curved cover plate 3 with the irregular shape, therefore the bonding adhesive layer can be pre-attached onto the flexible screen 2, or be pre-attached onto the curved cover plate 3 with the irregular shape.

The bonding adhesive layer is preferably an OCA layer. Of course, it should be noted that, the bonding adhesive layer can also be selected from other suitable adhesives, such as a SCA layer.

Figure 4:
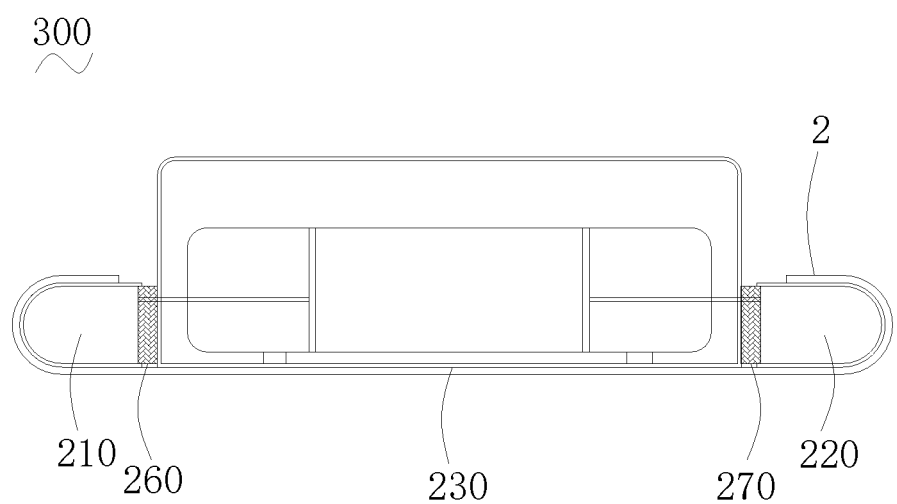
FIG. 4 is a cross-sectional view of an initial body according to an embodiment of the present disclosure.

Step S20, the flexible screen 2 is attached onto outer sides of the first bonding body 210, the pressing body 230, and the second bonding body 220, thus an initial body is obtained, as shown in FIG. 4.

Preferably, the first pressing wall 211, the second pressing wall 221, and the third pressing flat wall 231 are provided with one or more vacuum adsorption holes. The attaching the flexible screen 2 onto the outer sides of the first bonding body 210, the pressing body 230, and the second bonding body 220 includes: the flexible screen 2 is attached onto the outer sides of the first bonding body 210, the pressing body 230, and the second bonding body 220 by vacuum adsorption. Preferably, the adsorption pressure of the vacuum adsorption is from −60 kpa to −80 kpa, and is more preferably −80 kpa.

At this time, the first telescopic connector 260 and the second telescopic connector 270 are both in a compressed state.

Figure 5:
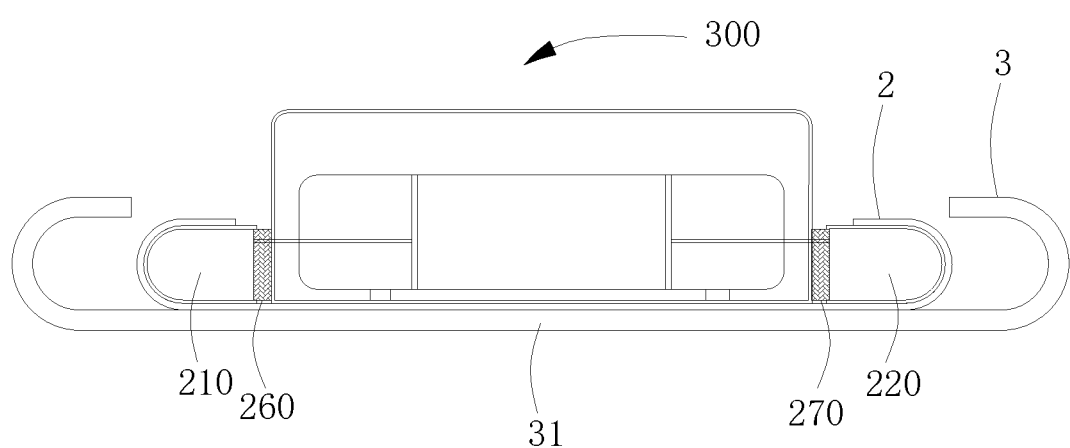
FIG. 5 is a cross-sectional view of the preliminary pressing of the initial body of FIG. 4 and a curved cover plate with an irregular shape.

Step S30, the initial body 300 is inserted into an inner side of the curved cover plate 3 with the irregular shape and the initial body 300 is pressed, such that attaching a portion of the flat area 31 of the curved cover plate 3 with the irregular shape to the flexible screen 2 is completed, as shown in FIG. 5.

At this time, the first telescopic connector 260 and the second telescopic connector 270 are still in the compressed state.

Figure 6:
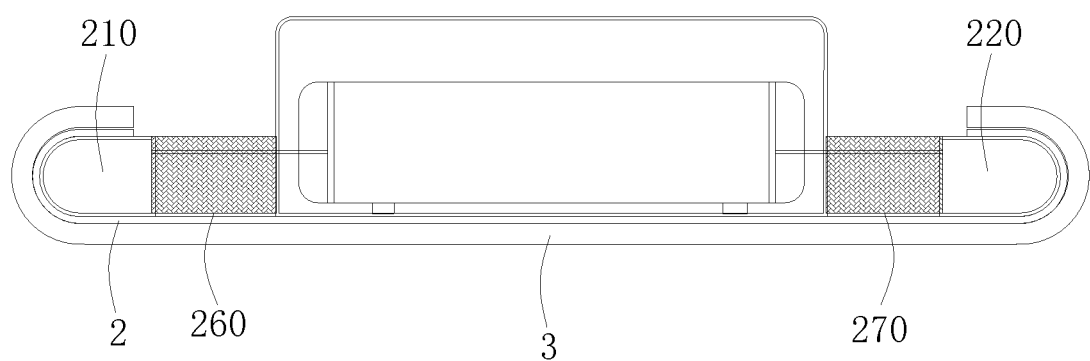
FIG. 6 is a cross-sectional view of completing pressing of the flexible screen and the curved cover plate with the irregular shape via the bonding device of FIG. 2.

Step S40, the driving mechanism 240 is driven to drive the first bonding body 210 and the second bonding body 220 to move along a direction towards or away from the hook arc areas, respectively, until attaching the curved cover plate 3 with the irregular shape to the flexible screen 2 is completed, as shown in FIG. 6.

Preferably, the bonding device 200 for attaching the curved cover plate with the irregular shape to the flexible screen further includes a cylinder 250 used to control the driving mechanism 240 to move along the direction towards or away from the arc hook areas 33.

Preferably, the driving mechanism includes a first driving component 241 used to drive the first bonding body 210 to move and a second driving component 242 to drive the second bonding body 220 to move.

The first driving component 241 includes a first link rod 243 fixed to the first bonding body 210 and a first driving rod 244 perpendicularly fixed to the first link rod 243.

The second driving component 242 includes a second link rod 245 fixed to the second bonding body 220 and a second driving rod 246 perpendicularly fixed to the second link rod 245.

During the operation of driving the driving mechanism 240 to drive the first bonding body 210 and the second bonding body 220 to move along the direction towards or away from the hook arc areas, respectively, the cylinder 250 drives the first driving rod 244 and the second driving rod 246 to move to both sides. When the first driving rod 244 moves, the first driving rod 244 drives the first link rod 243 and the first bonding body 210 to move to the left side, such that the first pressing flat wall 212 presses one side of the flat area 31 of the curved cover plate 3 with the irregular shape, then the first pressing curved wall 214 presses the arc hook area 33 on the left side of the curved cover plate 3 with the irregular shape. At the same time, when the second driving rod 246 moves, the second driving rod 246 drives the second link rod 245 and the second bonding body 220 to move to the right side, such that the second pressing flat wall 222 presses another side of the flat area 31 of the curved cover plate 3 with the irregular shape, then the second pressing curved wall 224 presses the arc hook area 33 on the right side of the curved cover plate 3 with the irregular shape.

Additionally, during the bonding process, the position of the pressing body 230 is kept stationary, the first telescopic connector 260 and the second telescopic connector 270 are gradually extended. When attaching the curved cover plate 3 with the irregular shape to the flexible screen 2 is completed, the extents of the extending of the first telescopic connector 260 and the second telescopic connector 270 are maximized.

Preferably, prior to driving the driving mechanism 240, the step further includes reducing the adsorption pressure of the vacuum adsorption. Preferably, after the adsorption pressure of the vacuum adsorption is reduced, the adsorption pressure is from −5 kpa to −20 kpa, and is preferably −10 kpa.

According to the aforementioned bonding method for attaching the curved cover plate 3 with the irregular shape to the flexible screen 2, the initial body 300 is inserted into the inner side of the curved cover plate 3 with the irregular shape, thereby avoiding interference between both ends of the flexible screen 2 and the both ends of the curved cover plate 3 with the irregular shape. Additionally, the hook arc areas 33 of the curved cover plate 3 with the irregular shape are sufficiently attached by the aforementioned method, thereby further improving the bonding effect.

The technical features of the embodiments described above can be arbitrarily combined. In order to make the description succinct, there is no describing of all possible combinations of the various technical features in the foregoing embodiments. It should be noted that there is no contradiction in the combination of these technical features which should be considered as the scope of the description.

Although the present disclosure is illustrated and described herein with reference to specific embodiments, the present disclosure is not intended to be limited to the details shown. It is to be noted that, various modifications may be made in the details within the scope and range of equivalents of the claims and without departing from the present disclosure. Therefore, the protection scope of the present disclosure shall be subject to the protection scope of the claims.

The invention claimed is:

1. A bonding device, for attaching a curved cover plate with an irregular shape to a flexible screen, wherein the curved cover plate with the irregular shape comprises a flat area and arc hook areas located on both sides of the flat area, and the arc hook areas smoothly transit with the flat area, the bonding device comprising:
   a first bonding body having a first pressing wall on a periphery of the first bonding body and a first pressing flat wall, the first pressing wall comprising a first pressing curved wall matching shapes of inner surfaces of the arc hook areas of the curved cover plate with the irregular shape and the first pressing flat wall provided continuously with the first pressing curved wall to correspond to a portion of the flat area of the curved cover plate with the irregular shape;
   a second bonding body having a second pressing wall formed on a periphery of the second bonding body and a second pressing flat wall, the second pressing wall comprising a second pressing curved wall matching shapes of inner surfaces of the arc hook areas of the curved cover plate with the irregular shape and a second pressing flat wall provided continuously with the second pressing curved wall to correspond to a portion of the flat area of the curved cover plate with the irregular shape;
   a pressing body pressing a center portion of the flat area of the curved cover plate with the irregular shape, the pressing body being located between the first bonding body and the second bonding body, and the pressing body having a third pressing flat wall configured to press the center portion of the flat area of the curved cover plate with the irregular shape on a periphery thereof; and
   a driving mechanism driving the first bonding body and the second bonding body to move to be adjacent or away from the pressing body,
   wherein the first bonding body, the second bonding body, and the pressing body each have a vacuum cavity therein configured to absorb the flexible screen;
   the bonding device for attaching the curved cover plate with the irregular shape to the flexible screen further comprising:
   a first telescopic connector configured to connect the pressing body and the vacuum cavity of inner of the first bonding body, both ends of the first telescopic connector are fixed to the pressing body and the first bonding body respectively and is compressed until the pressing body adjoining the first bonding body; and
   a second telescopic connector configured to connect the pressing body and the vacuum cavity of inner of the second bonding body, both ends of the second telescopic connector fixed to the pressing body and the second bonding body respectively and being compressed until the pressing body adjoining to the second bonding body.

2. The bonding device according to claim 1, wherein the first bonding body and the second bonding body are symmetrically arranged.

3. The bonding device according to claim 1, wherein the pressing body defines a cavity to receive the driving mechanism, and the driving mechanism is located in the cavity.

4. The bonding device according to claim 3, wherein:
   the driving mechanism comprises a first driving component configured to drive the first bonding body to move and a second driving component configured to drive the second bonding body to move, and the first driving component and the second driving component are provided opposite to each other;
   the first driving component comprises a first link rod and a first driving rod, the first driving rod is perpendicular to the third pressing flat wall, the first driving rod is reciprocally provided in the cavity of the pressing body with respect to the first bonding body, and the first driving rod is vertically connected to the first link rod; and
   the second driving component comprises a second link rod and a second driving rod, the second driving rod is perpendicular to the third pressing flat wall, the second driving rod is reciprocally provided in the cavity of the pressing body with respect to the second bonding body, and the second driving rod is vertically connected to the second link rod.

5. The bonding device according to claim 4, wherein the first driving component and the second driving component are symmetrically arranged.

6. The bonding device according to claim 1, wherein the first pressing wall, the second pressing wall, and the third pressing flat wall are respectively provided with one or more vacuum adsorption holes.

7. The bonding device according to claim 1, wherein the first telescopic connector and the second telescopic connector are both rubber bellows.

8. The bonding device according to claim 1, further comprising a cylinder configured to control the driving mechanism to move along a direction towards or away from the arc hook area.

9. The bonding device according to claim 1, wherein the driving mechanism comprises an expansion body and a gas source configured to inflate the expansion body, the expansion bodies are located between the first bonding body and the pressing body, and between the second bonding body and the pressing body, respectively, and the expansion bodies are configured to push the first bonding body and the second bonding body to move along a direction away from the pressing body, so as to attach the first bonding body and the second bonding body to the flexible screen.

10. The bonding device according to claim 1, wherein the first bonding body, the second bonding body, the pressing body, and the driving mechanism are made of aluminum alloy.

11. The bonding device according to claim 10, wherein the first bonding body, the second bonding body, the pressing body, and the driving mechanism are coated with a flexible buffer layer.

12. A bonding method for attaching a curved cover plate with an irregular shape to a flexible screen, comprising:
providing a flexible screen, a curved cover plate with an irregular shape, and a bonding device for attaching the curved cover plate with the irregular shape to the flexible screen, wherein the curved cover plate with the irregular shape comprises a flat area and arc hook areas located on both sides of the flat area, and the arc hook areas smoothly transit with the flat area, the bonding device comprises:
a first bonding body having a first pressing wall on a periphery of the first bonding body and a first pressing flat wall, the first pressing wall comprising a first pressing curved wall matching shapes of inner surfaces of the arc hook areas of the curved cover plate with the irregular shape and the first pressing flat wall provided continuously with the first pressing curved wall to correspond to a portion of the flat area of the curved cover plate with the irregular shape;
a second bonding body having a second pressing wall formed on a periphery of the second bonding body and a second pressing flat wall, the second pressing wall comprising a second pressing curved wall matching shapes of inner surfaces of the arc hook areas of the curved cover plate with the irregular shape and a second pressing flat wall provided continuously with the second pressing curved wall to correspond to a portion of the flat area of the curved cover plate with the irregular shape;
a pressing body pressing a center portion of the flat area of the curved cover plate with the irregular shape, the pressing body being located between the first bonding body and the second bonding body, and the pressing body having a third pressing flat wall configured to press the center portion of the flat area of the curved cover plate with the irregular shape on a periphery thereof; and
a driving mechanism driving the first bonding body and the second bonding body to move to be adjacent or away from the pressing body,
wherein the first bonding body, the second bonding body, and the pressing body each have a vacuum cavity therein configured to absorb the flexible screen;
the bonding device further comprises:
a first telescopic connector configured to connect the pressing body and the vacuum cavity of inner of the first bonding body, both ends of the first telescopic connector are fixed to the pressing body and the first bonding body respectively and is compressed until the pressing body adjoining the first bonding body; and
a second telescopic connector configured to connect the pressing body and the vacuum cavity of inner of the second bonding body, both ends of the second telescopic connector fixed to the pressing body and the second bonding body respectively and being compressed until the pressing body adjoining to the second bonding body;
attaching the flexible screen onto outer sides of the first bonding body, the pressing body, and the second bonding body, thus obtaining an initial body;
inserting the initial body into an inner side of the curved cover plate with the irregular shape and pressing the initial body, completing attaching a portion of the flat area of the curved cover plate with the irregular shape to the flexible screen; and
driving the driving mechanism to drive the first bonding body and the second bonding body to move along a direction towards the hook arc areas, respectively, until completing attaching the curved cover plate with the irregular shape to the flexible screen.

13. The bonding method according to claim 12, wherein the first pressing wall, the second pressing wall, and the third pressing flat wall are provided with one or more vacuum adsorption holes, the attaching the flexible screen onto the outer sides of the first bonding body, the pressing body, and the second bonding body comprising: attaching the flexible screen onto the outer sides of the first bonding body, the pressing body, and the second bonding body via vacuum adsorption.

14. The bonding method according to claim 13, wherein prior to driving the driving mechanism, the method further comprises reducing an adsorption pressure of the vacuum adsorption.

15. The bonding method according to claim 14, wherein the adsorption pressure is reduced from a pressure range of −60 kpa to −80 kpa to a pressure range of −5 kpa to −20 kpa.

* * * * *